United States Patent [19]

Schaffer

[11] Patent Number: 4,924,715
[45] Date of Patent: May 15, 1990

[54] CONTACT SENSING SYSTEM
[75] Inventor: Michael J. Schaffer, Mendham, N.J.
[73] Assignee: Nawsir Inc., Peapack, N.J.
[21] Appl. No.: 321,565
[22] Filed: Mar. 9, 1989

Related U.S. Application Data

[63] Continuation-in-part of Ser. No. 166,222, Mar. 10, 1988, abandoned.

[51] Int. Cl.⁵ .............................................. G01B 7/02
[52] U.S. Cl. ..................................... 73/865.8; 33/559
[58] Field of Search ........................... 73/866.5, 865.8; 33/503, 504, 172 E, 169 R, 559–561, 1 M; 310/318, 319, 338, 339; 377/17

[56] References Cited

U.S. PATENT DOCUMENTS

| | | | |
|---|---|---|---|
| 4,333,238 | 6/1982 | McMurtry | 33/504 |
| 4,455,755 | 6/1984 | Fritsche et al. | 33/504 |
| 4,780,961 | 11/1988 | Shelton et al. | 33/559 |
| 4,816,713 | 3/1989 | Change, Jr. | 310/338 |

FOREIGN PATENT DOCUMENTS

| | | | |
|---|---|---|---|
| 0051503 | 3/1986 | Japan | 33/561 |
| 0047506 | 3/1987 | Japan | 33/559 |
| 0271021 | 2/1914 | United Kingdom | 33/561 |

Primary Examiner—Robert R. Raevis
Attorney, Agent, or Firm—Richard T. Laughlin

[57] ABSTRACT

A contract sensing system is provided for a coordinate measuring machine which is manually operated. The system provides a control over the level of the sensing force of a work piece against a probe of the machine. The system also provides an instantaneous signal corresponding to the initial contact of the contacting force for avoiding displacement of the probe whereby the accuracy of the measurement is improved.

4 Claims, 2 Drawing Sheets

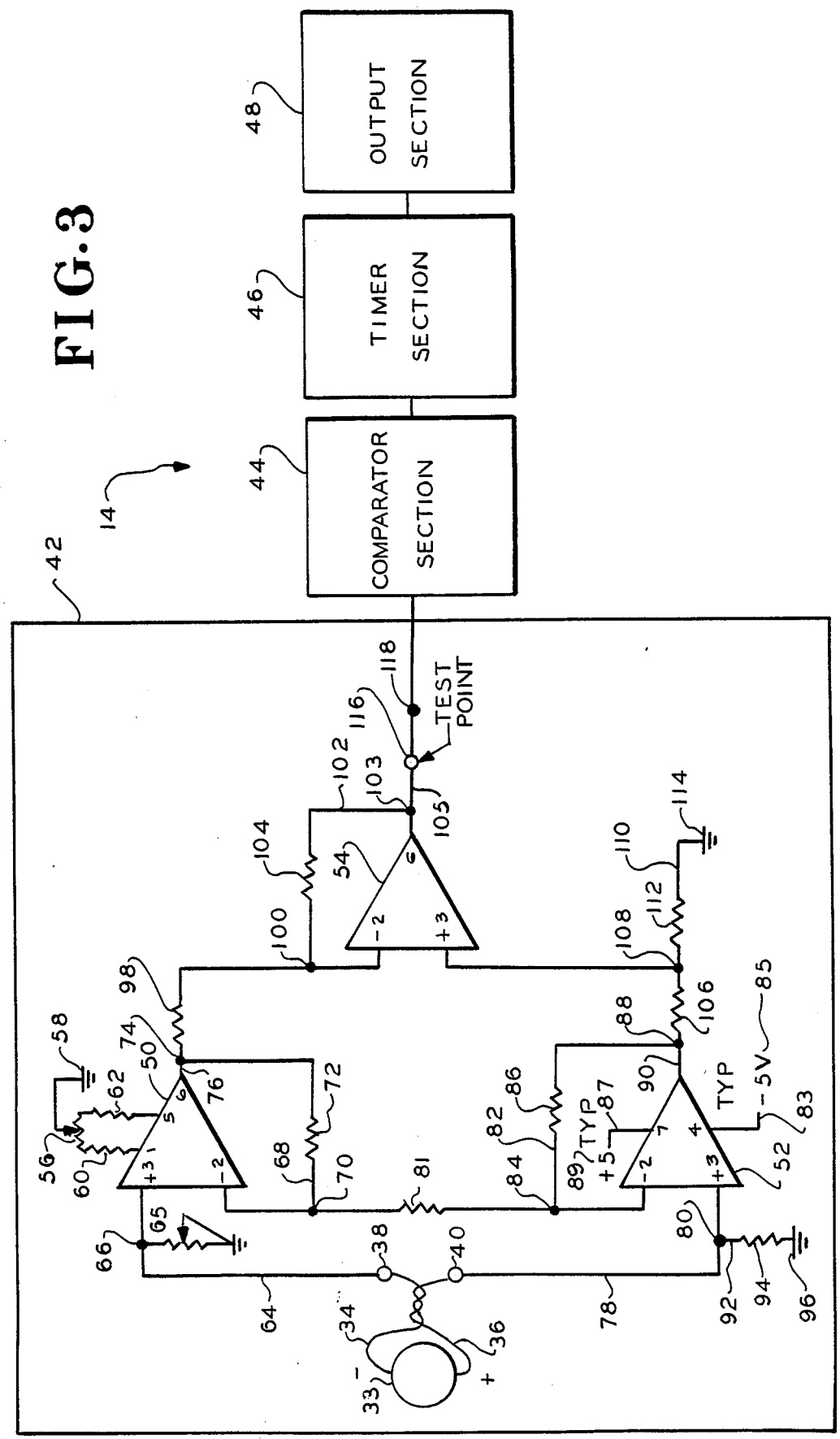

CONTACT SENSING SYSTEM

This application is a continuation-in-part of application Ser. No. 166,222 filed Mar. 10, 1988 entitled Contacting Sensing System, now abandoned.

The present invention relates in general to a contact detecting device for use on a Coordinate Measuring Machine (CMM), and more specifically to a sensing device that does not employ a flexible coupling, and for an electronic circuit located away from the CMM and which is not subject to spurious signals and also is not time dependent.

BACKGROUND OF THE INVENTION

A CMM is a device which has three mutually perpendicular axes, each one having attached to it a measurement scale (a linear electronic measuring device) and counter. A counter is an electronic device that keeps track of the output of a scale and converts the electronic pulses into a digital output. When a signal is received, the counter will "latch", that is, the counter will store the exact value it had when the signal was received in a buffer, but continue to keep track of the machines current position as it continues to move.

The axes on the CMM are commonly known as X which measures left to right, Y which measures front to back, and Z which measures up and down. The part of the CMM that moves in the Z direction is called the Z-rail. A stylus is attached either directly, or through a probe to the bottom of the Z-rail. The stylus is a shaft with a ball on one end and a threaded shank on the opposite end for securing to the frame. The axes of the CMM are arranged in such a way that movement of any one, two, or all three of them result in movement of the stylus. When this stylus comes in contact with the workpiece, the three counters must be "latched" by a signal from either a hand switch or an electronic probe.

A CMM properly equipped with motors, drive shafts, computers, and the like, may have the stylus position under numerical control, however virtually all machines on the market today are equipped with frictionless air bearings and so an operator may position the stylus by grasping the Z-rail and with it position the three axes as required. Such a CMM is known to be manually controlled.

An electronic probe is a device, for use on a CMM, which has a flexible coupling consisting of a moveable and a fixed member, a means for attaching a stylus to the movable member of the flexible coupling, a means for detecting that the moveable member has been displaced and/or that the stylus has made contact with the workpiece and a means for signaling the counters to latch.

The accuracy of an electronic probe is determined by a number of factors as follows:

1. The ability of the moveable member of its flexible coupling to return to the exact point in space relative to the fixed member, after a force which displaced it is removed
2. The difference in the amount of displacement of the moveable member of the flexible coupling, in all directions, required for it to signal contact with the workpiece
3. The time required by the electronics, to signal the counters, multiplied by the variation in speed at which the stylus is traveling, when it makes various contacts with the workpiece.

A numerically controlled CMM must have its stylus attached to the Z-rail through an electronic probe as there is no operator to work a hand switch to latch the counters, and the flexible coupling incorporated in all known electronic probes is required to prevent damage to the stylus, probe, and/or CMM in the event that the Z-rail does not stop immediately upon contact with the workpiece.

It is common practice to have the stylus of a manually controlled CMM attached to the Z-rail without an electronic probe and flexible coupling. It is possible to do so as the operator is relied upon to reduce the speed of the stylus (and therefore the three axes of the machine) as it approaches the workpiece and his wrist and arm act in place of a flexible coupling and allow the stylus to "bounce" off the piece. It should be noted that the styli used in this fashion are considerably more rugged with shafts typically having a ⅜" diameter whereas the styli used with electronic probes have diameters less then ⅛". In fact the heavier styli are sometimes referred to as "solid probes" a term which has led to confusion in the past. When used in this manner, the operator brings the ball of the stylus into contact with the workpiece, holds it there until the machine "settles", and then depresses the hand switch to latch the counters. This method has the following problems:

1. Depending on where and with how much force the stylus is held in contact with the work piece, the stylus and or entire Z frame may be deflected.
2. The work piece may be warmed by the operators hands while waiting for the machine to settle.
3. If a reading is taken before the machine is fully settled errors may occur.
4. If the switch is not in an acceptable location the probe may be moved while reaching for it.
5. The method is inherently slow.
6. The method is highly susceptible to variations due to operator's pressure of stylus on the work piece.

OBJECTS OF THE INVENTION

It is an object of the invention to provide a system with an electronic circuit for use with coordinate measuring machines that is not subject to the errors of a flexible coupling, or to errors caused by the operator. In another sense it is the object of the invention to have an electrical circuit located away from a piezo crystal, that immediately senses when the piezo is excited and yet is not subject to spurious signals. Other objects and the advantages of the invention will appear from the following detailed description.

SUMMARY OF THE INVENTION

According to the present invention, a coordinate measuring machine is provided. The coordinate measuring machine includes a stylus which is to be brought into contact with the workpiece, a support structure for supporting the stylus and for manually moving the stylus in all directions, a piezoelectric crystal affixed to the structure which becomes excited the moment the stylus makes contact with the workpiece, and an electronic circuit for the elimination of spurious signals and instantaneous output of valid signals.

By using the piezoelectric crystal, a stylus rigidly attached to the support structure, and the specific circuit of this invention, the problems of using a flexible coupling between the stylus and support structure, and the problem of variations in deflection of the stylus in a coordinate measuring machine and workpiece are over-come since the signal is given before the parts are stressed.

BRIEF DESCRIPTION OF THE DRAWINGS

FIG. 3 is a circuit of the coordinate measuring machine.

DETAILED DESCRIPTION OF THE INVENTION

Figure 1:
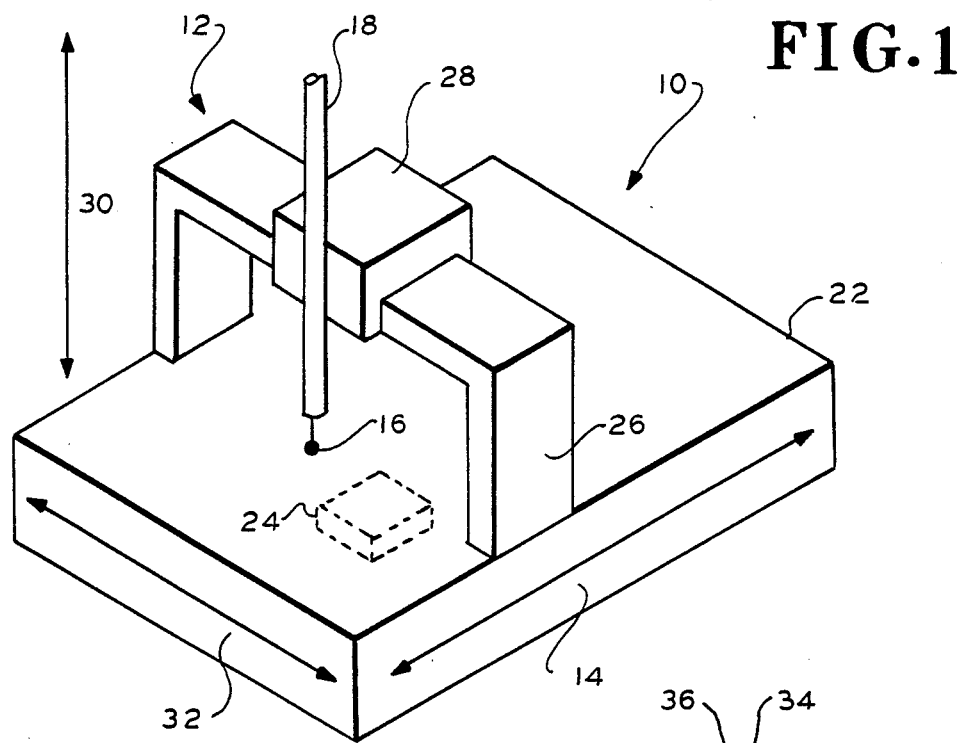
FIG. 1 is an isometric view of a coordinate measuring machine according to the invention.
Figure 2:
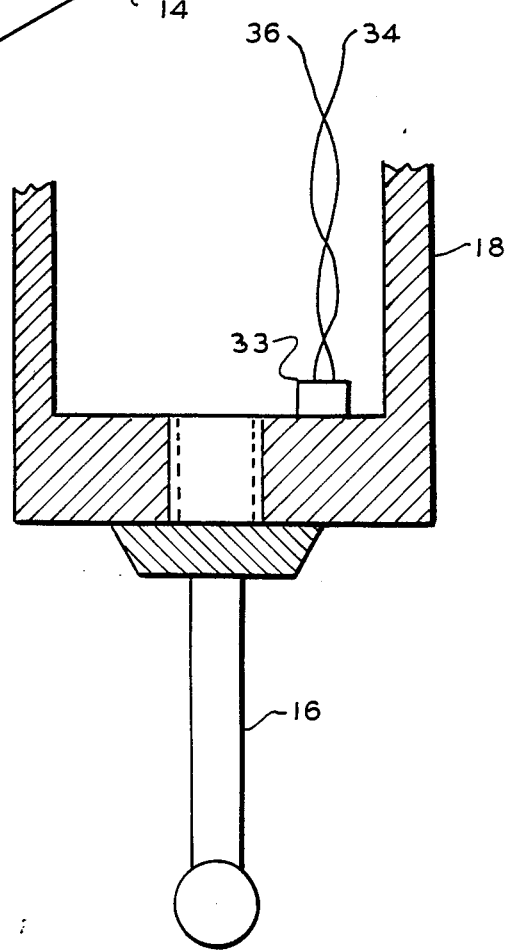
FIG. 2 is a cutaway view of the bottom of the Z-rail of the coordinate measuring machine.

As shown in FIGS. 1, 2 and 3, a contact sensing system 10 is provided. System 10 includes a coordinate measuring machine 12 and an electronic circuit 14 for sensing contact.

Machine 12 includes a stylus 16, a head 18, and a base 22. Head 18 is commonly called a Z-rail. Machine 12 is able to measure the dimensions of a workpiece 24. Machine 12 includes a longitudinal carriage 26 which is guided by ways and floats on air bearings to give longitudinal movement in a longitudinal direction 27, and includes a transverse carriage 28 which is guided by ways and floats on air bearings to give transverse movement in a transverse direction 32. Head 18 which moves relative to carriage 26, gives vertical movement in a vertical direction 30. It can be seen that an operator holding the head near the bottom can position the stylus throughout the cube defined by the three axes.

As shown in FIG. 2, head 18 has a piezoelectric crystal 33 for converting a slight contact force on the stylus 16 to an electrical signal. Crystal 33 is connected to the electrical circuit by a first connector 34 and by a second connector 36, which are a twisted pair of wires, or a ribbon cable with a pair of wires, or the like so that both wires will receive the same amount of interference from sources other than the crystal such as radio waves etc. First connector 34 has an output terminal pin 38; and second connector 36 has an output terminal pin 40. Crystal 33 is shown schematically in both FIGS. 2 and 3 for ease of illustration; and has a conventional design.

As shown in FIG. 3, amplifier section 42 includes a first amplifier 50, a second amplifier 52, and a third amplifier 54, each of the 741 type.

First amplifier 50 has an output terminal pin 1, an input terminal pin 2, an input terminal pin 3, an output terminal pin 5 and an output terminal pin 6. A potentiometer 56, which is connected to ground 58, connects through a resistor 60 to output terminal pin 1 on one side of potentiometer 56; and also connects through a resistor 62 to output terminal pin 5 of amplifier 50 on the other side of potentiometer 56.

A connector 64 extends from input terminal pin 3 of amplifier 50 through a junction 66 and connects to output terminal pin 38 of crystal 33. A potentiometer 65, which is connected to ground 67, connects to junction 66. A connector 68 extends from input terminal pin 2 of amplifier 50, through a junction 70, through a resistor 72, through a junction 74. An output connector 76 extends from output terminal pin 6 of amplifier 50 to junction 74.

Second amplifier 52 has an input terminal pin 2, an input terminal pin 3, a side terminal pin 7. A connector 78 extends from input terminal pin 3 of amplifier 52, through a junction 80 to output terminal pin 40 of crystal 33.

A resistor 81 connects at one end to junction 70 and connects at its other end to a junction 84. A connector 82 extends from input terminal pin 2 of amplifier 52, through the junction 84, through a resistor 86, through a junction 88. An output connector 90 extends from output terminal pin 6 of amplifier 52 to junction 88. A connector 83 extends from side terminal pin 4 to a −5 volt source 85. A connector 87 extends from side terminal pin 7 of amplifier 52 to a +5 volt source 89. A connector 92 extends from junction 80, through a resistor 94, to a ground 96.

Third amplifier 54 includes an input terminal pin 2, an input terminal pin 3, and an output terminal pin 6. Connector 76 extends from output terminal pin 6 of amplifier 50, through junction 74, through a resistor 98, through a junction 100, to input terminal pin 2 of third amplifier 54. A connector 102 extends from junction 100, through a resistor 104, to a junction 103. A connector 90 extends from output terminal pin 6 of second amplifier 52, through junction 88, through resistor 106, through junction 108, to input terminal pin 3 of third amplifier 54.

A connector 110, extends from junction 108, through resistor 112, to ground 114. A connector 105, extends from output terminal pin 6 of third amplifier 54, through junction 103, through test point 116, through junction 118 to the comparator section 44, the timer section 46, and the output section 48.

Comparator section 44 includes a means by which a voltage different from null at junction 118 can be detected and a means for signaling the timer section 46 to begin its cycle.

Timer section 46 includes a means for sustaining the output signal from comparator section 44 long enough to prevent multiple signals from being sent to the buffer section in the event that the stylus bounces against the workpiece and generates several signals instead of one.

Buffer section 48 includes a means for providing the proper signal to the counters of the coordinate measuring machine.

The operation of the circuit is discussed hereafter. Piezoelectric crystal 33 is attached to Z-rail 18 of machine 12. When stylus 16 is brought into contact with workpiece 24 to be measured, a shock wave excites crystal 33, and crystal 33 outputs an electric signal. Positive and negative signals generated by crystal 33 are sent through wires 34, 36 to pins 38, 40. Both wires 34, 36 are connected respectively to ground 67, 96 the positive by fixed resistor 94, the negative by potentiometer 65. By "tuning" potentiometer 65, the highest common mode rejection ratio is achieved.

The signals then enter a cross-coupled pre-amplifier stage, first and second amplifiers 50,52 with differential input and output. First amplifier 50 has an offset adjust means of resistors 60, 62 and potentiometer 56. The first and second amplifiers have equal gain and therefore signals of equal magnitude at pins 3 of amplifiers 50 and 52 will not be amplified as there will be no potential on the two ends of resistor 81.

The output of first and second amplifiers 50,52 is then input to pins 2 and 3 of third amplifier 54 respectively. Third amplifier 54 is configured as a standard instrumentation amplifier, which uses four ratio matched, single array resistors 98, 104, 106, 112. Third amplifier 54 provides a single ended output with a potential of + or −5 volts. This output is monitored at test point junction 116 to adjust P1 potentiometer 65 and P2 potentiometer 56 for highest common mode rejection and null offset. The signal at junction 118 is monitored by the comparator section and when it varies from null by a predetermined amount it triggers the timer section 46 which sustains the output signal for long enough to prevent multiple signals from being sent to the buffer section in the event that the stylus bounces against the workpiece and generates several signals instead of one. The buffer section 48 sends the signal to the counters of the coordinate measuring machine.

It can be seen that spurious signals from sources other then the crystal, such as radio waves or noise from electric motors, will act equally on both wires of the twisted pair 34, 36 and will not result in a signal 118. Signals coming from the crystal will act on differentially on amplifier section 42 and will result in a variation from null at junction 118.

From the foregoing description it is apparent that various modifications and changes can be made without departing from the spirit and scope of the invention. Such changes and modifications are intended to be included within the scope of the claims.

What is claimed is:

1. A contact sensing system for a coordinate measuring machine having a Z-rail with a stylus and a transducer means that changes the energy transferred by a work piece contacting the stylus into an electrical signal; and an electrical circuit means including an amplifier section which amplifies electrical signals from the transducer means and including a comparator section, connected to the amplifier section and including a timer section connected to the comparator section, and including an output section connected to the timer section, wherein the amplifier section comprises three op-amps, the first of which has a first potentiometer for adjusting the offset of its output, the negative end of the transducer is connected to the non-inverting input of a first op-amp and is connected to ground through a second potentiometer, the positive end of the transducer is connected to the non-inverting input of a second op-amp and is connected to ground through a resistor, the output of the first op-amp is connected to its inverting input through a resistor, the output of the second op-amp is connected to its inverting input through a resistor, the inverting inputs of the first and second op-amp are connected to each other through a resistor, the output of the first op-amp is connected to the inverting input of a third op-amp through a resistor, the output of the second op-amp is connected to the non-inverting input of the third op-amp through a resistor, the inverting input of the third op-amp is connected to its output through a resistor, the non-inverting input of the third op-amp is connected to ground through a resistor.

2. The system as defined in claim 1 wherein the transducer means is a piezo crystal affixed to the Z-rail and connected to the electrical circuit means by wires being subject to the same amount of interference.

3. The system of claim 2 wherein the wires are a twisted pair of wires.

4. A contact sensing system for a coordinate measuring machine comprising a Z-rail containing a transducer means and a stylus, said transducer means changes the energy transferred by a work piece contacting the stylus into an electrical signal; and an electrical circuit means remote from the Z-rail including an amplifier section which amplifies electrical signals from the transducer means and suppresses signals which come from sources other than from the transducer, a comparator section connected to the amplifier section for instantaneous triggering of a signal to indicate that contact has been made when the output from the amplifier section deviates from null by a preset amount, and including a timer section connected to the comparator section for preventing further signals after the initial signal of contact for a preset amount of time, and including an output section connected to the timer section for making the initial signal compatible with the desired output signal wherein the amplifier section comprises three op-amps, the first of which has a first potentiometer means for adjusting the offset of its output, the negative end of the transducer is connected to the non-inverting input of a first op-amp and is connected to ground through a second potentiometer means, the positive end of the transducer is connected to the non-inverting input of a second op-amp and is connected to ground through a resistor, the output of the first op-amp is connected to its inverting input through a resistor, the output of the second op-amp is connected to its inverting input through a resistor, the inverting inputs of the first and second op-amps are connected to each other through a resistor, the output of the first op-amp is connected to the inverting input of a third op-amp through a resistor, the output of the second op-amp is connected to the non-inverting input of the third op-amp through a resistor, the inverting input of the third op-amp is connected to its output through a resistor, the non-inverting input of the third op-amp is connected to ground through a resistor.

* * * * *